(12) United States Patent
Suzuki et al.

(10) Patent No.: US 7,011,207 B2
(45) Date of Patent: Mar. 14, 2006

(54) CONVEYING CHAIN GUIDE

(75) Inventors: Kenshi Suzuki, Osaka (JP); Masatoshi Sonoda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 52 days.

(21) Appl. No.: 10/766,378

(22) Filed: Jan. 27, 2004

(65) Prior Publication Data

US 2005/0011734 A1 Jan. 20, 2005

(30) Foreign Application Priority Data

Jan. 28, 2003 (JP) .............................. 2003-019109

(51) Int. Cl.
B65G 15/60 (2006.01)
(52) U.S. Cl. .................................... 198/838; 198/845
(58) Field of Classification Search ................ 198/845, 198/838, 834

See application file for complete search history.

(56) References Cited

U.S. PATENT DOCUMENTS

| | | | | |
|---|---|---|---|---|
| 2,044,158 A | * | 6/1936 | Dunlop | .................... 474/140 |
| 2,793,516 A | * | 5/1957 | McDermott | .................. 431/292 |
| 3,319,778 A | * | 5/1967 | Bessant | ....................... 198/834 |
| 5,620,084 A | * | 4/1997 | Mensch | ....................... 198/834 |
| 6,213,462 B1 | * | 4/2001 | Schmidt | ..................... 271/204 |
| 6,402,137 B1 | * | 6/2002 | Gunschera | .................. 271/204 |
| 6,834,754 B1 | * | 12/2004 | Pietz | ........................... 198/330 |

FOREIGN PATENT DOCUMENTS

JP          55-063047          12/1980

* cited by examiner

*Primary Examiner*—Joe Dillon, Jr.
(74) *Attorney, Agent, or Firm*—Woodling, Krost and Rust

(57) ABSTRACT

A conveying chain guide, in which the stick slip phenomenon of a conveying chain, which meshes with a driving sprocket, and a seasickness phenomenon are removed whereby stable conveying of articles can be smoothly realized and the driving force and vibration noise of a conveying chain can be remarkably reduced. When continuous three rollers C1, C2, C3 in the conveying chain C is to be meshed with the sprocket while gradually descending from the linear rail R for supporting the conveying surface toward the driving sprocket S, in such an arrangement traveling state that always corresponds to the linear rail R for supporting the conveying surface, a transfer position X1 and a meshing position X2, the guide track T is defined along an movement passage of the roller C2 in the transfer position X1.

3 Claims, 3 Drawing Sheets

CONVEYING CHAIN GUIDE

TECHNICAL FIELD TO WHICH THE INVENTION PERTAINS

The present invention relates to a conveying chain guide used for canceling a change in the speed of a conveying chain, which performs a polygonal motion by meshing with a driving sprocket in a conveyor, which conveys articles.

RELATED ART

As a related art there is known a pulsation-preventing device for a sprocket driving chain, which provides on a tension side of a roller chain trained around a driving sprocket a deflection guide member having a deflection arc surface, which abut with a roller of a roller chain to deflect the chain whereby the chain is trained around the driving sprocket, and in which a relationship between a chain length L and a chain pitch P between points where the roller of the roller chain begin to contact the deflection guide member and a tooth of the driving sprocket, respectively is set to $L=(n+0.5)\times P$. This pulsation-preventing device prevents rotational variations, so called, a pulsation (see the following Patent Reference 1, for example). Patent Reference 1 is Japanese Laid-open Patent Publication No. (Sho) 55-63047 (on page 1, FIG. 2).

PROBLEM TO BE SOLVED BY THE INVENTION

However, the conventional pulsation-preventing device for a sprocket driving chain is designed in such a manner that the centers of the rollers pivot-connected to a roller chain are advanced to a driving sprocket along the tangential line of a meshing pitch circle. Accordingly, when the number of teeth of the driving sprocket is small, a change in the speed of a roller chain is caused by a polygonal motion, which is generated at a meshing position where the roller chain was meshed with the driving sprocket.

Further, such a change in the speed of the roller chain leads to a cause of falling down, falling out or the like, which is generated in a conveying article on a conveyor, so called a stick slip phenomenon, and generates forward and backward motions and up and down motions of assembled articles on an assembling line, so called a seasickness phenomenon thereby to produce an assembly defective, or an change in tension in the roller chain is generated and an excessive driving power is required whereby a chain's size is increased and vibration and noise is increased, which makes conveying operation environment worse.

Accordingly, the objects of the present invention are to solve the above-mentioned related art problems and to provide a conveying chain guide, in which the stick slip phenomenon of a conveying chain, which meshes with a driving sprocket, and a seasickness phenomenon are removed whereby stable conveying of articles can be smoothly realized and the driving force and vibration noise of a conveying chain can be remarkably reduced.

MEANS FOR SOLVING THE PROBLEMS

The invention of claim 1 solves the above-mentioned problems by that a conveying chain guide disposed in a transfer position just before a conveying chain, in which a number of rollers were sequentially pivot-connected to each other at given chain pitches and said conveying chain was traveled on a linear rail for supporting a conveying surface at a fixed speed, is meshed with a driving sprocket, which is rotated at a fixed speed, and including a guide track to cancel an change in the speed generated in the rollers of said conveying chain, which performs a polygonal motion at a meshing position just after said conveying roller chain was meshed with said driving sprocket, characterized in that when continuous three rollers in the conveying chain is to be meshed with the sprocket while gradually descending from the linear rail for supporting the conveying surface toward said driving sprocket, in such an arrangement traveling state that always corresponds to a linear rail for supporting the conveying surface, a transfer position and a meshing position, said guide track is defined along an movement passage of the roller in said transfer position.

The invention of Claim 2 further solves the above-mentioned problems by that in addition to the configuration of the above-mentioned claim 1, said guide track has continuous two arc-shaped curves.

"The transfer position" in the present invention means a movement region from the linear rail R for supporting the conveying surface to a position where the roller in the conveying chain sent from the linear rail for supporting the conveying surface approaches the driving sprocket while descending to mesh with it. Further, "the meshing position" in the present invention means a movement region from a position where the roller meshed with the driving sprocket to a position where the roller was moved until a subsequent roller meshes with the driving sprocket.

Action

According to the present invention, when continuous three rollers in the conveying chain is to be meshed with the sprocket while gradually descending from the linear rail for supporting the conveying surface toward the driving sprocket, in such an arrangement traveling state that always corresponds to a linear rail for supporting the conveying surface, a transfer position and a meshing position, the guide track is defined along an movement passage of the rollers in said transfer position. Thus, the guide track formed of continuous two arc-shaped curves cancel a change in the speed of a conveying chain, which is meshed with the driving sprocket to perform a polygonal motion, whereby the variations of the conveying chain speed are removed.

The invention will be better understood when reference is made to the BRIEF DESCRIPTION OF THE DRAWINGS, DETAILED DESCRIPTION OF THE INVENTION AND CLAIMS which follow hereinbelow.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

Figure 1:
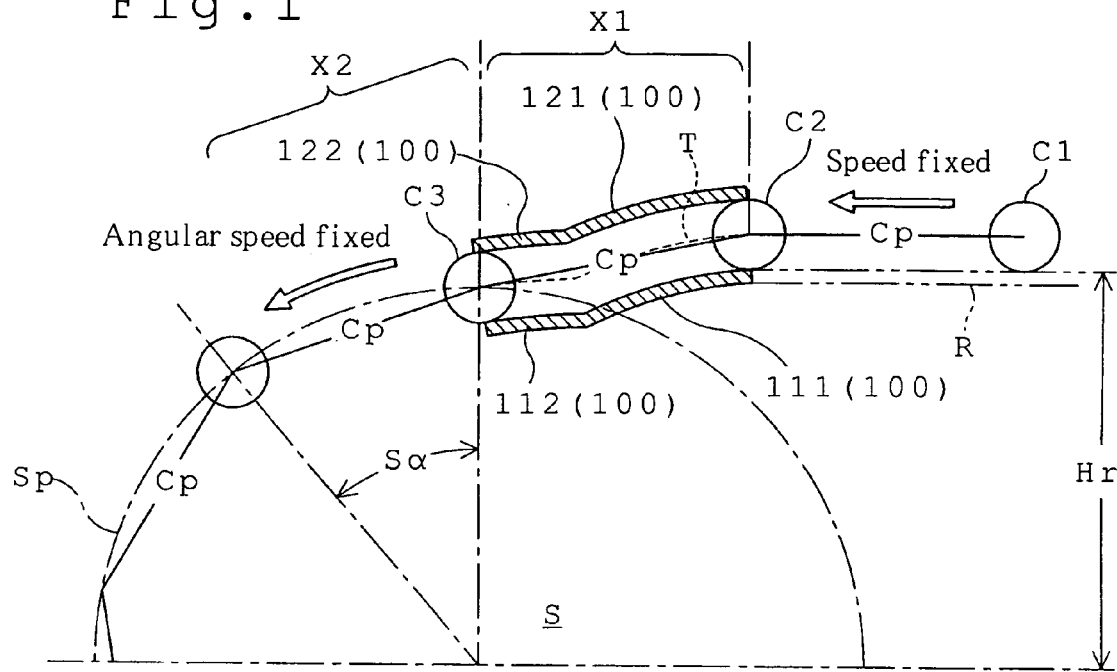
FIG. 1 is an arrangement view of a conveying chain guide, which is a first Example of the present invention.
Figure 3:
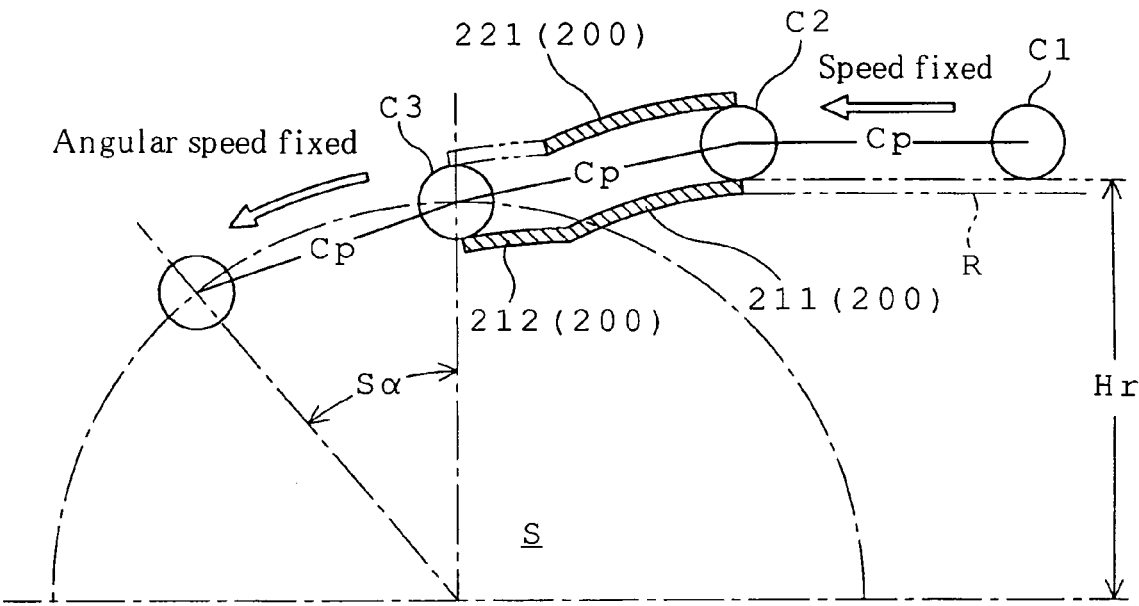
FIG. 3 is an arrangement view of a conveying chain guide, which is a second Example of the present invention.
Figure 4:
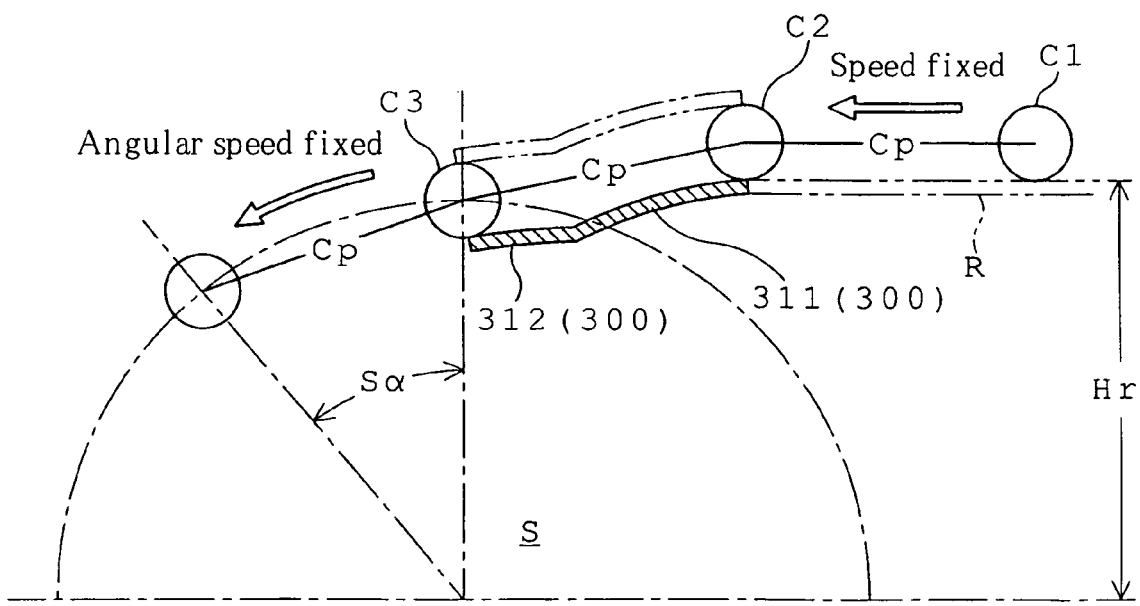
FIG. 4 is an arrangement view of a conveying chain guide, which is a third Example of the present invention.
Figure 5:
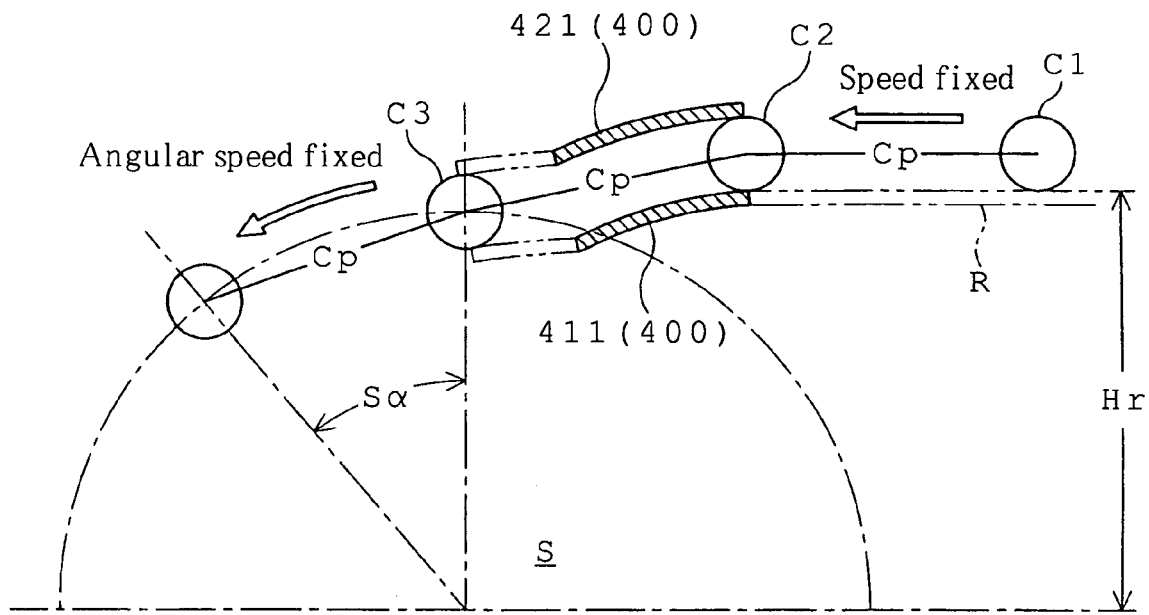
FIG. 5 is an arrangement view of a conveying chain guide, which is a fourth Example of the present invention.
Figure 6:
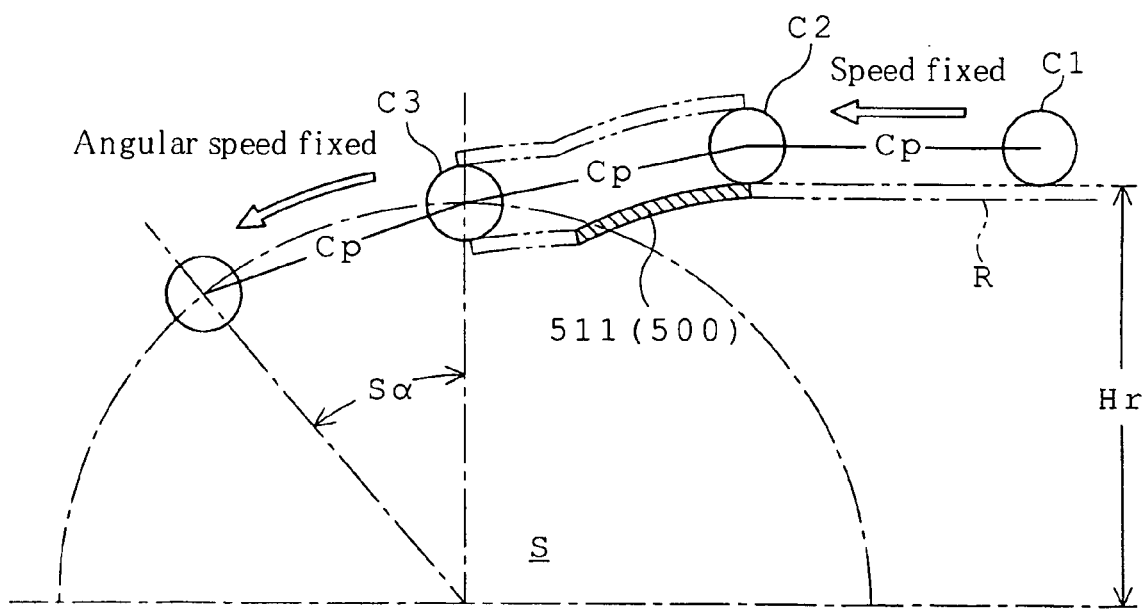
FIG. 6 is an arrangement view of a conveying chain guide, which is a fifth Example of the present invention.

Examples of preferable embodiments of a conveying chain guide according to the present invention will be described below with reference to drawings. FIG. 1 is an arrangement view of a conveying chain guide 100, which is a first Example of the present invention, FIG. 2 is a view showing a movement passage of rollers in a conveying chain, FIG. 3 is an arrangement view of a conveying chain guide 200, which is a second Example of the present invention, FIG. 4 is an arrangement view of a conveying chain guide 300, which is a third Example of the present invention, FIG. 5 is an arrangement view of a conveying chain guide 400, which is a fourth Example of the present invention, and FIG. 6 is an arrangement view of a conveying chain guide 500, which is a fifth Example of the present invention.

The conveying chain guide 100, which is the first Example of the present invention, is disposed at a transfer position X1 just before a conveying chain C in which a number of rollers C1, C2, C3, . . . were sequentially pivot-connected to each other at given chain pitches Cp and the rollers were traveled at a fixed speed on a linear rail R for supporting the conveying surfaces, is meshed with a driving sprocket S, which is rotated at a fixed speed, to cancel an change in the conveying chain C speed, as shown in FIG. 1. It is noted that a reference numeral Sα in FIG. 1 denotes a pitch angle per one tooth of the driving sprocket.

Figure 2:
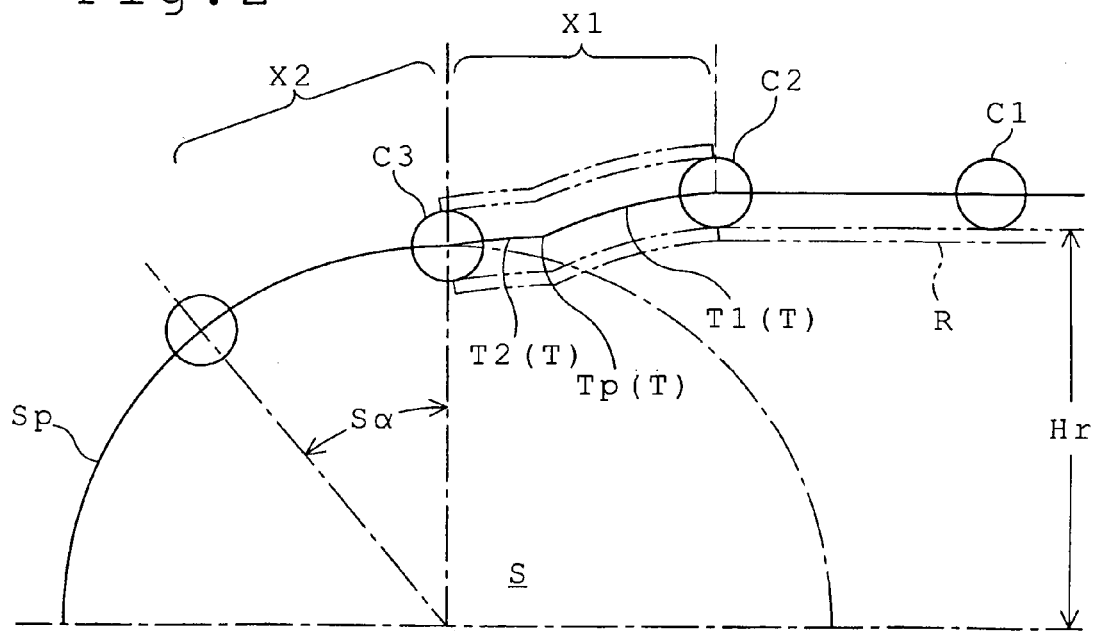
FIG. 2 is a view showing a movement passage for a conveying chain roller.

As shown in FIG. 2, when continuous three rollers C1, C2, and C3 in the conveying chain is to be meshed with the sprocket S while gradually descending from the linear rail R for supporting the conveying surfaces toward driving sprocket S, in arrangement traveling states, which are always corresponding to the a linear rail R for supporting the conveying surface, the transfer position X1 and the meshing position X2, a guide track T, which is formed in the conveying chain guide 100 of the present invention, is defined as a movement passage consisting of continuous two arc-shaped curves T1 and T2 where the roller C2 can be smoothly moved while keeping a distance of a chain pitch Cp from the roller C1 and the roller C3, respectively.

Here, "the transfer position X1" in the present invention means for example a movement region from the linear rail R for supporting the conveying surface to a position where the roller C2 in the conveying chain C sent from the linear rail R for supporting the conveying surface approaches the driving sprocket S while descending to mesh with it. "The meshing position X2" in the present invention means for example a movement region from a position where the roller C meshed with the driving sprocket S to a position where the roller was moved until a subsequent roller C meshes with the driving sprocket S.

Further, an arrangement level Hr of the linear rail R for supporting the conveying surface may take any arrangement level, in which the conveying chain can mesh with the driving sprocket while gradually descending and the above-mentioned guide track T can form continuous two arc-shaped curves T1 and T2, that is an arrangement level higher than the tangential line of a meshing pitch circle Sp (not shown) formed in the driving sprocket S.

Further, in FIG. 2, an inflection point Tp between two arc-shaped curves T1 and T2 can be defined as a traveling position of the roller C2 when the roller C1, which is traveling on the linear rail R for supporting the conveying surface, the roller C2, which is traveling on the transfer position X1 and the roller C3, which is traveling on the meshing position X2 were brought into a linear arrangement state.

Therefore, the conveying chain guide of the present invention can be provided on at least a lower side or an upper side of a movement passage for the transfer position X1 based on a radius of curvature of the guide taking the two arc-shaped curves T1, T2 forming the above-mentioned movement passage and the roller radii of the rollers C1, C2, C3 into consideration.

That is the conveying chain guide 100 of the first Example shown in FIG. 1 comprises lower guides 111, 112 and upper guides 121, 122 provided along the movement passage taking the radii of the rollers at the transfer position X1 into consideration. Next, the conveying chain guide 200 of the second Example shown in FIG. 3 comprises lower guides 211, 212 and an upper guide 221 provided along the movement passage taking the radii of the rollers at the transfer position X1 into consideration. Next, the conveying chain guide 300 of the third Example shown in FIG. 4 comprises lower guides 311, 312 provided along the movement passage taking the radii of the rollers at the transfer position X1 into consideration. Also the conveying chain guide 400 of the fourth Example shown in FIG. 5 comprises a lower guide 411 and an upper guide 421 provided on the side of the linear rail R for supporting the conveying surface in the movement passage taking the radii of the rollers at the transfer position X1 into consideration, and the conveying chain guide 500 of the fifth Example shown in FIG. 6 comprises a lower guide 511 provided on the side of the linear rail R for supporting the conveying surface in the movement passage taking the radii of the rollers at the transfer position X1 into consideration.

In the conveying chain guides 100, 200, 300, 400 and 500 obtained as mentioned above, when continuous three rollers C1, C2, and C3 in the conveying chain is to be meshed with the sprocket S while gradually descending from the linear rail R for supporting the conveying surfaces toward driving sprocket S, in arrangement traveling states, which are always corresponding to the linear rail R for supporting the conveying surface, the transfer position X1 and the meshing position X2, a transfer position X1 just before meshing with the driving sprocket S is defined along a movement passage consisting of continuous two arc-shaped curves T1 and T2 where the roller C2 can be smoothly moved while keeping a distance of a chain pitch Cp from the roller C1 and the roller C3, respectively. Accordingly, such guide track T absorbs an change in the speed of the conveying chain C, which meshes with the driving sprocket S to perform a polygonal motion, so as to cancel the change, whereby the speed variation of the conveying chain C can be removed.

Therefore, according to the conveying chain guide of the present invention, a stick slip phenomenon, which is a cause of the falling down and falling out of the conveying articles, which is liable to occur in a conveyor due to speed variation in the conveying chain C, which is meshed with the driving sprocket S to perform a polygonal motion, or a seasick phenomenon, which is a cause of the front and rear or up and down motions of articles, which are liable to occur in an assembly line, is removed and a stable article conveying operation or a reliable assembling operation can be smoothly attained. Accordingly, the driving power and the variation noise of the conveying chain C is remarkably reduced whereby the worsening of an environment for the conveying operation can be prevented and a change in the conveying chain C tension is avoided so that a miniaturization of the conveying chain C can be attained.

Effects of the Invention

According to the present invention, when continuous three rollers in the conveying chain is to be meshed with the sprocket while gradually descending from the linear rail for supporting the conveying surface toward the driving sprocket, in such an arrangement traveling state that always corresponds to a linear rail for supporting the conveying surface, a transfer position and a meshing position, the guide track is defined along an movement passage of the rollers in said transfer position. Thus, the guide track formed of continuous two arc-shaped curves cancel a change in the speed of a conveying chain, which is meshed with the driving sprocket to perform a polygonal motion, whereby the variations of the conveying chain speed can be removed. Therefore, according to the conveying chain guide of the present invention, a conventional stick slip phenomenon, which is liable to occur in a conveying chain, which is meshed with the driving sprocket to perform a polygonal motion, or a seasick phenomenon, are removed so that a stable article conveying operation can be smoothly attained, and the driving power and the variation noise of the conveying chain can be remarkably reduced.

Description of Reference Numerals

100, 200, 300, 400, 500 . . . Conveying chain guide

111, 211, 311, 411, 511 . . . Lower guide provided on a side of a linear rail R for supporting a conveying surface

112, 212, 312 . . . Lower guide provided on a driving sprocket S side

121, 221, 421 . . . Upper guide provided on the side of the linear rail R for supporting a conveying surface

122 . . . Upper guide provided on the driving sprocket S side

S . . . Driving sprocket
Sp . . . Meshing pitch circle for the driving sprocket S
Sα . . . Pitch angle for the driving sprocket S
C . . . Conveying chain
C1 . . . Roller traveling on the linear rail R for supporting the conveying surface
C2 . . . Roller sent from the linear rail R for supporting the conveying surface
C3 . . . Roller, which have been just meshed with the driving sprocket S
Cp . . . Chain pitch
R . . . Linear rail for supporting a conveying surface
X1 . . . Transfer position
X2 . . . Meshing position
T . . . Guide track
T1, T2 . . . Arc-shaped curve
Tp . . . Inflection point between the arc-shaped curves T1 and T2
Hr . . . Arrangement level of the linear rail R for supporting the conveying surface The invention has been described herein by way of example only and those skilled in the art will readily recognize that changes may be made to the invention as described herein without departing from the spirit and scope of the claims which follow hereinbelow.

What is claimed is:

1. A conveying chain guide disposed in a transfer position between a driving sprocket and a linear rail for supporting a conveying surface, a conveying chain comprising a plurality of chain rollers sequentially pivotally connected to each other at given chain pitches, said conveying chain traveling on said linear rail and driving said conveying surface at a fixed speed, said chain rollers interengage and mesh with said driving sprocket and move polygonally about said driving sprocket, said driving sprocket rotating at a fixed angular speed, characterized in that
said chain guide comprises a transfer passageway having a first arc-shaped curved portion and a second arc-shaped curved portion, said first and second arc-shaped curved portions being continuous, said chain rollers of said conveying chain passing through said transfer passageway of said chain guide thereby substantially removing any speed variation of said conveying chain and permitting smooth operation of said conveying surface.

2. A conveying chain guide as claimed in claim 1 wherein said guide further includes lower portions and upper portions.

3. A conveying chain guide as claimed in claim 1 wherein said guide further includes an inflection point between said first and second arc-shaped curved portions.

* * * * *

UNITED STATES PATENT AND TRADEMARK OFFICE
CERTIFICATE OF CORRECTION

PATENT NO. : 7,011,207 B2
DATED : March 14, 2006
INVENTOR(S) : Suzuki et al.

It is certified that error appears in the above-identified patent and that said Letters Patent is hereby corrected as shown below:

Column 1,
Line 63, after "invention" delete "of claim 1".

Column 2,
Line 16, after "invention" delete "of Claim 2".
Line 17, after "problems" delete "by that".
Line 17, after "in" delete "addition to the configuration of the above-mentioned claim 1," and insert -- that --.

Signed and Sealed this

Twenty-third Day of May, 2006

JON W. DUDAS
*Director of the United States Patent and Trademark Office*